United States Patent [19]

Langlois

[11] 4,065,274
[45] Dec. 27, 1977

[54] METHOD AND APPARATUS FOR REMOVING PARTICULATE POLLUTANTS FROM STACK GASES

[75] Inventor: Roland E. Langlois, Newark, Ohio

[73] Assignee: Owens-Corning Fiberglas Corporation, Toledo, Ohio

[21] Appl. No.: 652,444

[22] Filed: Jan. 26, 1976

Related U.S. Application Data

[63] Continuation-in-part of Ser. No. 532,264, Dec. 12, 1974, abandoned.

[51] Int. Cl.² .................................................. B01D 47/16
[52] U.S. Cl. .......................................... 55/89; 55/94; 55/230; 55/238; 55/394
[58] Field of Search ............... 55/68, 73, 84, 94, 223, 55/230, 238, 394, 406, 466, 89; 65/2, 9, 10, 11 R, 14; 209/144

[56] References Cited

U.S. PATENT DOCUMENTS

| | | | |
|---|---|---|---|
| 2,195,707 | 4/1940 | Nutting | 55/223 |
| 2,373,969 | 4/1945 | Lincoln | 55/406 X |
| 3,133,875 | 5/1964 | Hirschbeck et al. | 55/94 X |
| 3,264,805 | 8/1966 | Tyler | 55/238 |
| 3,274,757 | 9/1966 | Wapler | 55/238 |
| 3,348,830 | 10/1967 | Pearl et al. | 55/238 X |
| 3,613,333 | 10/1971 | Gardenier | 55/94 X |
| 3,709,670 | 1/1973 | Eriksen | 65/10 X |

Primary Examiner—Thomas G. Wyse
Assistant Examiner—Robert H. Spitzer
Attorney, Agent, or Firm—John W. Overman; Ronald C. Hudgens; Hiram P. Settle, Jr.

[57] ABSTRACT

A pollution control system for reducing the presence of fine aerosol particles in stack gases from the manufacture of glass fiber wool-type products. After larger particles are removed from the forming fan gas, the gas is fed into a centrifugal fan and massive quantities of water are injected into the fan intake. The aerosol particles are agglomerated by impact with the airborne water droplets and the wet surfaces of the fan. The larger, coalesced or agglomerated particles are more readily susceptible to inertia-type separation from the air by either the action of the fan or in a later separation operation. The massive volumes of water which are required to be injected into the fan for optimum particulate removal tend to accumulate in the fan housing, and the present invention utilizes one or more stripping slots in the fan housing which make use of the kinetic energy of the wash water as it travels along the inside surface of the fan housing to positively strip the wash water from the interior of the fan housing and into a water shroud to gravity drain the wash water into a hopper or the like.

17 Claims, 7 Drawing Figures

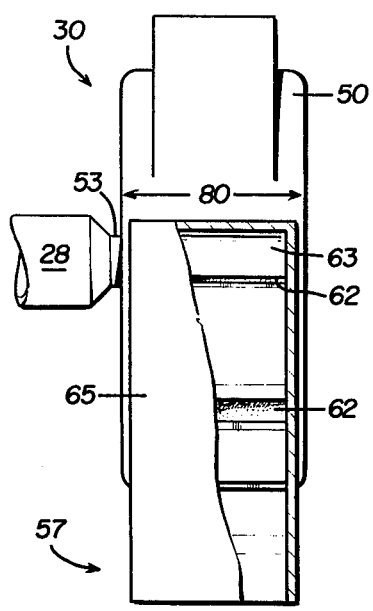
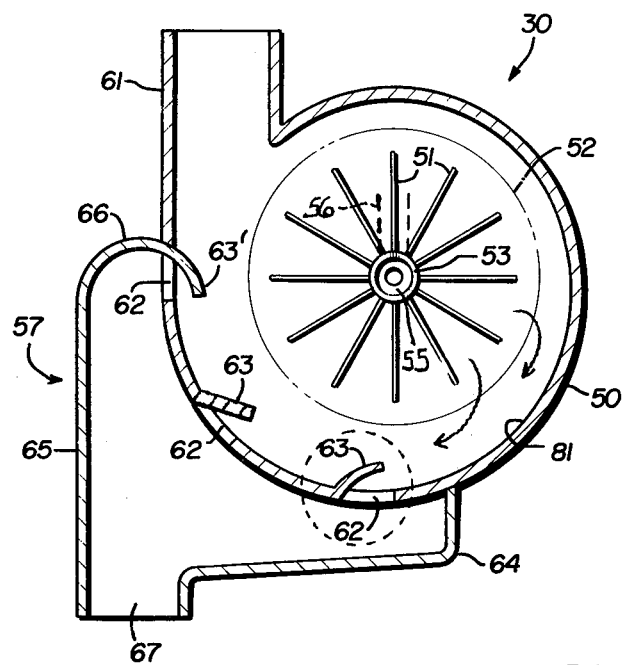
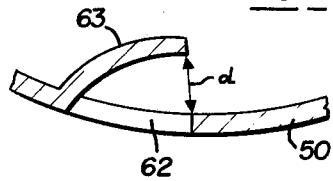
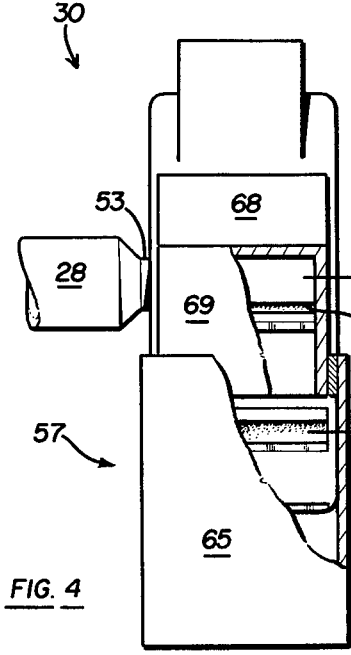

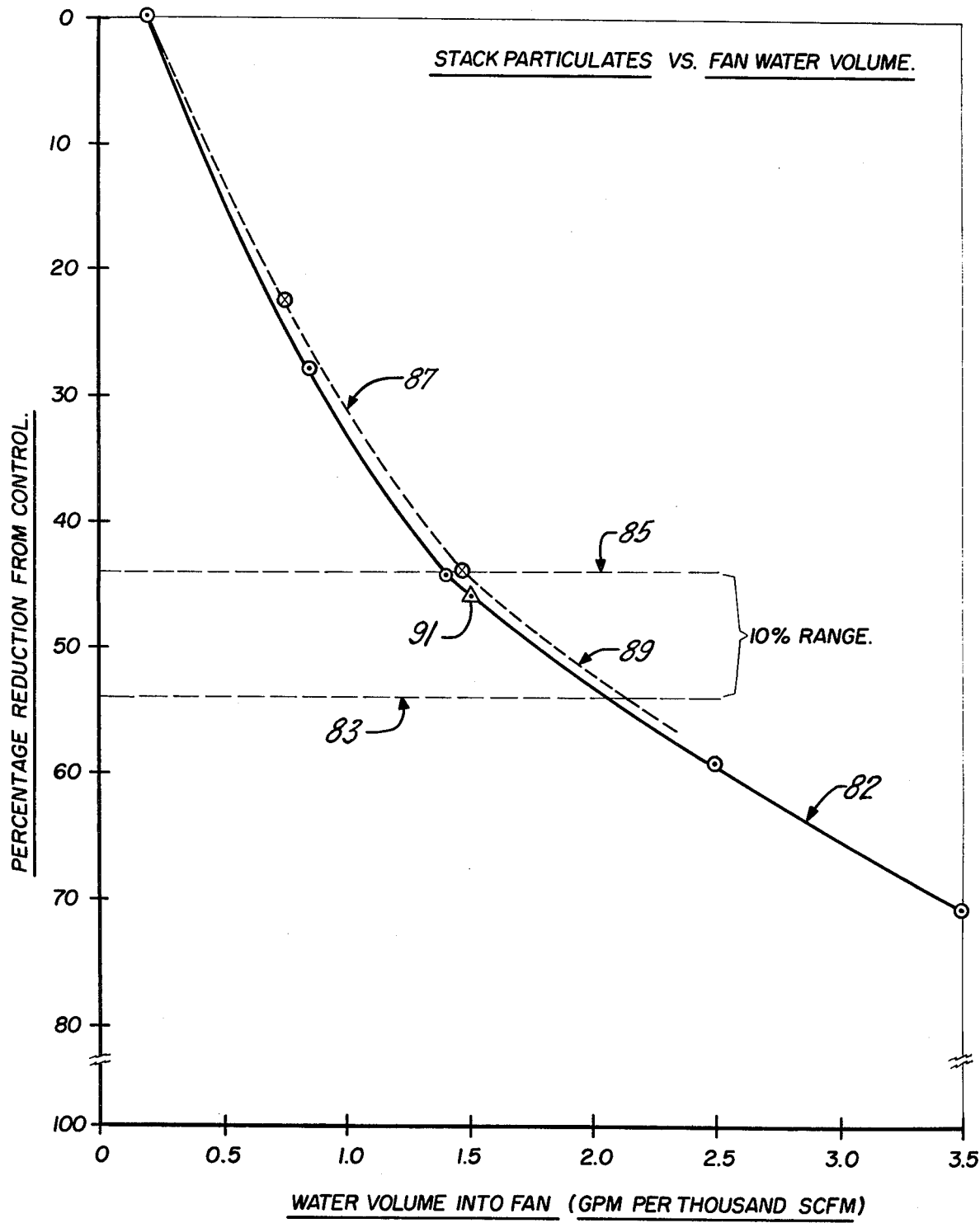

METHOD AND APPARATUS FOR REMOVING PARTICULATE POLLUTANTS FROM STACK GASES

REFERENCE TO RELATED CASES

This application is a continuation-in-part of application Ser. No. 532,264 filed on Dec. 12, 1974 and now abandoned, by Rolland E. Langlois for Pollution Control System For Removing Particles From Stack Gases, which is assigned to the Assignee of the present invention and which is now abandoned.

BACKGROUND OF THE INVENTION

1. Field of the Invention

The invention relates generally to a method and apparatus for removing fine particulate pollutants from stack gases and more particularly to an improved method and apparatus for draining the centrifugal fans used in such a system.

2. Description of the Prior Art

In the manufacture of glass fiber wool-type products, molten glass from a melting and refining tank flows into and through a centrifuge forming step downwardly onto a foraminous belt. As the glass fibers are falling onto the belt, a cureable organic resin binder is sprayed into the stream of fibers. The foraminous belt conveys the fiber and resin mixture through a curing oven, wherein the resin is cured to bind the fibers into a wool-like product.

Located beneath the foraminous conveyor is an air intake chute into which air is induced from the falling fiber-resin mixture, along with induced factory air. This air flow is induced by one or more fans (three in the present embodiment) pulling air through the chute and discharging air into an upper fallout chamber, de-entrainent device or "penthouse" from which the air passes into a vertical exhaust stack for flow into the ambient atmosphere.

The fans may be quite large and huge volumes of air, normally on the order of 50,000 to 150,000 standard cubic feet per minute (scfm) for the total fan system flow through the chute directly beneath the glass fiber supporting belt. This induced air contains miscellaneous solid and liquid particles, e.g. glass fibers, unreacted phenol and aldehyde components of the resin, uncured liquid resin, factory air-entrained solids and calcium sulfate, phosphate, or carbonate which are precipitates of the catalysts normally used for the phenol formaldehyde resin. The particulate content of this air is on the order of 0.400 grains per scf. According to typical Environmental Protection Agency (EPA) standards, the maximum allowable effluent from the stack is 0.020 grains per scf, so removal of 95% of the particulate content is necessary to comply with the EPA regulations. While the EPA standards may vary from state to state, the above example is an actual typical EPA value.

Prior to the present invention, the particulates in the forming air exhaust have been treated primarily by the use of "dropout boxes". Such boxes are interposed between the forming conveyor and the fan, and water is sprayed into the box. Due to the large cross-sectional area of the box and the water sprayed thereinto, large particulate particles drop out in the box through a combination of water impingement with the particulate and settling of the particulate from the slowly moving air traveling through the box. As a result, the total particulate count at the outlet of the box drops to about 0.040 grains per scf. Although 90% of the particulates have been removed by use of the dropout box, the remaining particulates are all fine particles, in the nature of aerosols, which follow the air flow through the forming fan and the final settling penthouse. It is these particles in the stack gas which make up the chemical plume or haze issuing from the stacks in typical glass wool forming operations.

It is necessary that these fine particulates be removed from the forming air in order to conform with the various federal, state and local EPA regulations. The present invention utilizes massive quantities of water sprayed into the forming fan to insure compliance with these regulations. The aerosol particles are agglomerated and coalesced by impact between the particles and the water droplets as well as between the particles and the wet surfaces of the fan and the fan shroud or hood. The fan may be provided with a venturi throat inlet and massive amounts of water, on the order of 1.5 gallons per minute (gpm) per thousand standard cubic feet per minute (scfm) of forming air per fan, are introduced into the fan inlet as a spray of water droplets.

The massive quantities of water which are injected into the forming fan are essential for the efficient operation of the present system in order to achieve optimum particulate removal. The centrifugal fans of the prior art were unable to continually handle these massive quantities of water due to the tendency of the fan housing to partially fill with water.

The present invention provides a method and apparatus for removing fine particulate pollutants from stack gases by injecting massive volumes of wash water into a centrifugal fan receiving the stack gases and positively stripping these massive volumes of wash water from the fan housing to achieve maximum particulate removal.

SUMMARY OF THE INVENTION

As described, the method and apparatus of the present invention operate to remove fine particulate pollutants from stack gases by injecting massive volumes of wash water into the venturi inlet of a centrifugal fan which receives the stack gases and then stripping these massive volumes of wash water from the interior of the fan housing via a plurality of stripping slots formed in the outer surface of the housing. Interposed in each of these slots and into the interior of the fan housing is a fluid-deflecting member. The slots and the fluid-deflecting members extend across substantially the entire width of the fan housing. The deflecting members utilize the kinetic energy of the water as it travels along the interior surface of the fan housing to strip the water from the interior of the housing and expel it out of the slots. A fixed water shroud which has an upper portion extending substantially the entire width of the fan housing is positioned to receive the expelled water and offer substantially no resistance to the passage of the water from the slots. The water then flows down the interior of the shroud and can be directed to a hopper or drain by gravity techniques.

One embodiment of the present invention employs a full 180° fluid-turning vane as the deflecing member associated with the last stripping slot on the discharge side of the fan housing and locates the vane on substantially the horizontal centerline of the fan shaft. An alternate embodiment utilizes a similar vane mounted on the inside of a fan access door and adapts the upper portion of the water shroud to receive the discharge end of the vane inside the shroud to complete the 180° turning effect.

In either embodiment, the process air containing fine particulate pollutants is passed through a centrifugal fan having a venturi inlet. Massive quantities of water or wash water are sprayed into the inlet to break the quantities of water into droplets to wet the blades of the fan and the interior surfaces of the fan housing. The particle-water contact which occurs as the process air passes through the fan causes the fine particulates to agglomerate into larger composite masses.

The operation of the fan rotor and centrifugal force causes the water and at least a portion of the composite masses to be directed outwardly to travel circumferentially along the interior surface of the outside wall of the fan housing. The traveling water and composite masses impinge on a deflection member and are diverted through slots out of the fan housing where they are collected and drained away from the housing by gravity. The process air passing through the fan may be subjected to additional separation by inertia-separation techniques, if desired.

Hence the fan drainage problem is solved by the present invention and such improved fans can be employed in pollution control systems to remove sufficient particulate pollutants from stack gases such that the strict EPA standards can be met or surpassed.

BRIEF DESCRIPTION OF THE DRAWINGS

These and other objects and advantages of the present invention will become more readily apparent upon reading the following specification which describes an illustrative embodiment of the invention, along with the accompanying claims and drawings in which:

FIG. 2 is an enlarged sectional view, with parts shown in elevation, of one of the forming fans of the present invention;

FIG. 3 is an end view of the discharge side of the fan and water shroud of FIG. 2;

FIG. 4 is an enlarged sectional view, with parts shown in elevation, of an alternate embodiment of one of the forming fans and water shrouds of the present invention;

FIG. 5 is an end view of the discharge side of the fan and water shroud of FIG. 4;

FIG. 6 is a blown-up view of the stripping slot and deflection member enclosed within the dotted circle of FIG. 2; and FIG. 7 is a graphical representation of the percentage reduction of stack particulates from a control volume vs. fan water volume.

DESCRIPTION OF THE PREFERRED EMBODIMENT

Figure 1:
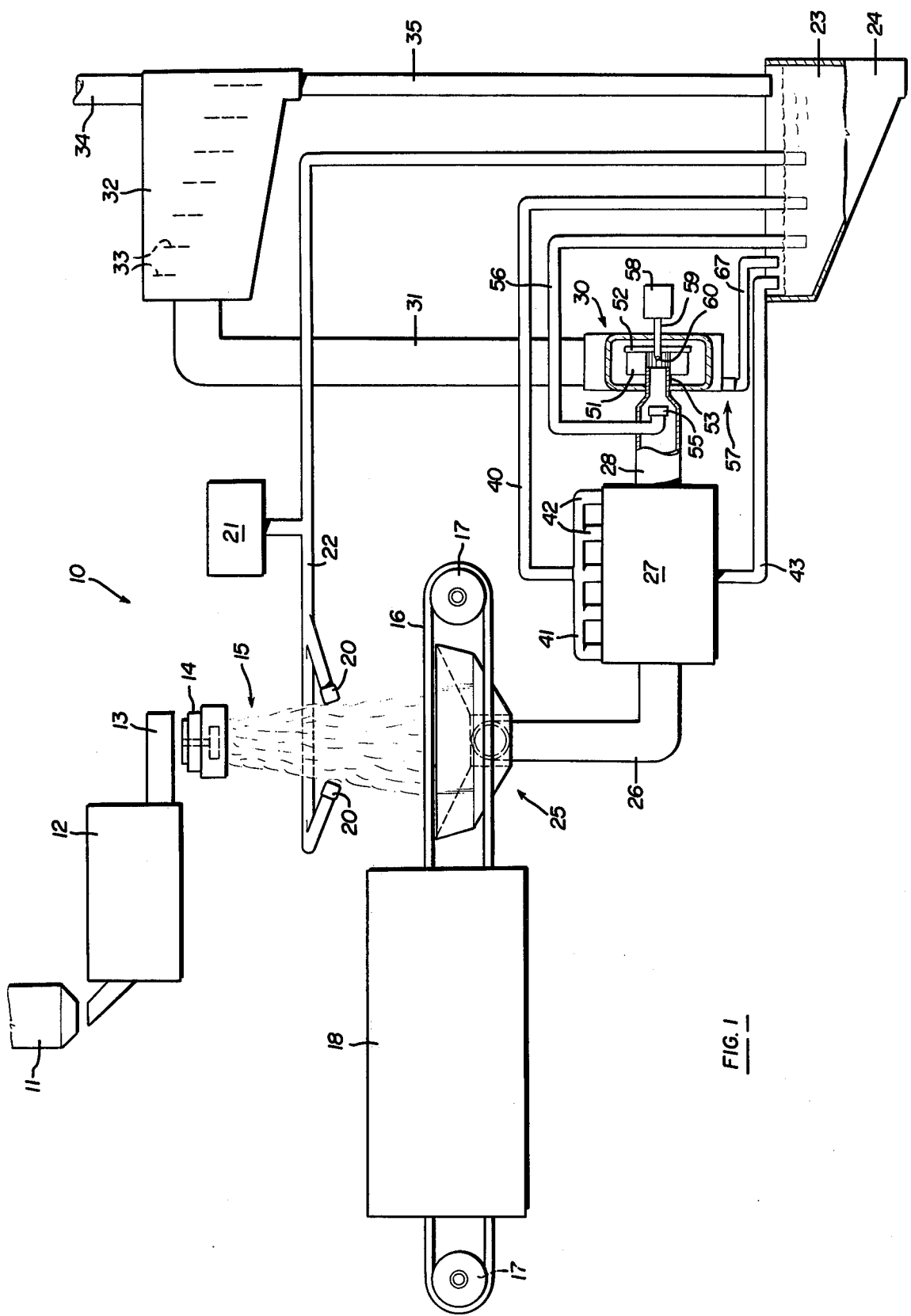
FIG. 1 is a schematic representation of a glass fiber wool-type forming system equipped with apparatus for carrying out the method of the present invention.

In FIG. 1, reference numeral 10 refers generally to an apparatus for carrying out a glass fiber wool-type manufacturing process, which apparatus is provided to carry out the method of the present invention.

More specifically, the apparatus 10 includes a batch hopper 11 discharging into a glass melting and refining tank 12 provided with a forehearth 13 receiving molten and refined glass from the tank 12. Molten glass issuing from the forehearth 13 passes through a centrifugal forming means 14, the glass issuing from the forming means 14 as a stream of glass fibers 15 falling gravitationally onto a foraminous forming conveyor 16 trained about a pair of guide drums 17 for passage through a curing oven 18. During their free fall from the forming means 14 onto the conveyor 16, the fibers 15 are sprayed with a binder issuing from spray nozzles 20. From the nozzles 20, the organic resinous binder, such as a phenol formaldehyde resin, is introduced from a hopper 21 into the spray nozzle conduit 22, this conduit receiving wash water 23 from a hopper 24, the wash water 23 passing through the conduit 22 under pressure from a pump (not shown).

Located directly beneath the foraminous conveyor 16 and directly in the path of the glass fiber flow into the conveyor 16 is a collection hopper 25 communicating with a dropout or drop box 27 (hereinafter more fully described in detail) and finally through a second conduit 28 to the axial intake of a fan 30. While only a single fan 30 will be described for the purposes of explanation, it will be realized that a plurality of fans 30 arranged in parallel could, in fact, be utilized to handle the massive air flow involved, as known in the art. Three fans were in fact, utilized in the examples given herein. The discharge of the fan 30 is upwardly through a discharge conduit 31 to an upper collection space deentrainment device or "penthouse" 32 provided with internal, vertical, staggered baffles 33 interposed between the conduit 31 and an exhaust stack 34. A drain conduit 35 is provided from the penthouse to the drain receptable 24.

Thus the air flow of the forming air occurs from the receptacle 25 and the conduit 26 through the drop box 27 and the conduit 28 to the inlet of the fan 30. From the fan 30, the forming air passes through the conduit 31 into the penthouse 32 and through the penthouse 32 out through the exhaust stack 34. Primary particulate separation occurs at the drop box 27. More specifically, it will be noted that the drop box 27 communicates with a wash water conduit 40 interconnecting the drain receptacle 24 with an inlet manifold 41 from which spray conduits depend into the drop box 27, as at 42. The wash water under pressure from a pump (not shown) sprayed into the drop box 27 through the manifold 41 affects a first separation of particulate materials from the forming air, as hereafter more fully described. The drop box 27 is provided with a drain 43 leading back to the receptacle 24.

As illustrated in FIGS. 1 and 2, the centrifugal fan 30 is surrounded by a scroll-type shroud or fan housing 50. An external water shroud or plenum 57 is associated with the fan 30. The fan 30 includes a drive 58 which may be a motor, a driven pulley or the like. The drive 58 operates to rotate a fan support shaft 59 which rotates a fan backplate 52. A shaft tip 60 extends beyond the backplate 52 and a plurality of radial blades 51 are secured in a substantially edgewise annular manner about the shaft top 60 to the face of the fan backplate 52 as shown in FIG. 2. The specific construction of the centrifugal fan blade assembly is not essential to understanding the present invention, and many of the constructions used in the centrifugal fans of the prior art would prove suitable. One could use, for example, such a fan assembly as disclosed in the U.S. Pat. No. 2,195,707 which is incorporated by reference herein.

The conduit 28 from the drop box 27 to the fan 30 is contoured to define a venturi-type inlet 53 which terminates interiorly of the fan 30 and in a spaced relationship to the backplate 52. Located at the entrance to the venturi inlet 53 is a spray nozzle 55 connected by a conduit 56 to the receptable 24 to receive wash water therefrom. A pump or other pressurizing device, not shown, but known in the art, supplies wash water under pressure through the conduit to the spray nozzle 55.

The hopper 25 receives process air from the forming means 14 and the resin spray nozzles 20, as well as factory air induced into the hopper by virtue of operation of the fan 30. The air induced into the hopper 25 typically may, for example, have the following general characteristics:

1. Volume: 90,000 scfm (standard cubic feet per minute).
2. Relative humidity: less than 100%.
3. Temperature: approximately 140° F.
4. Impurities: amounting to approximately 0.400 grains per scf particulate plus gaseous impurities (aldehyde plus phenol).
5. The solid and liquid particulates consist of less than 5% glass fiber, unreacted resin components (phenol and formaldehyde), uncured but reacted liquid resin, factory air entrained solids, and precipitated catalytic solids (calcium sulfate, phosphate or carbonate).

Since typical state Environmental Protective Agency maximum standards at the stack 34, in the present example, call for not more than 0.020 grains per scf, it is obvious that substantial amounts of particulate must be removed from the process air at the hopper 25 before it is released through the stack 34.

It will be noted that the cross-sectional area of the drop box 27 is substantially greater than the cross-sectional area of the conduit 26. Further, from 1500 gallons per minute to 2500 gallons per minute of wash water are introduced into the drop box 27 through the conduit 40 and the manifold 41. After passage through the drop box, the air in the conduit 28 may typically have the following properties:

1. Volume: 90,000 scfm.
2. Relative humidity: approximately 100%.
3. Temperature: approximately 115° F.

The total particulate count in the air exiting from the drop box through the conduit 28 is about 0.040 grains per scf or about 10% of the particulate count at the hopper 25. This 90% particulate reduction drop occurs because (1) the large particulate drops out, (2) the velocity impingement of particulate with the large volume of water sprayed through the manifold 41 into the drop box 27, and (3) the particulate agglomerates and settles out of the lower velocity air flow through the drop box. Further, some of the volatiles (primarily aldehyde and phenol gases) may be dissolved in the wash water in equilibrium with the air which is at about 100% relative humidity.

Although the total particulate count is reduced to about 10% of that in the initial process air, all of the remaining particulate is so fine as to be airborne in the air stream in the conduit 28. These fine particulates actually constitute aerosol particles which are so small (on the order of 100 microns or less) as to follow the air flow aerodynamically and, as such, have little susceptibility to filtration or settling.

In view of the nature of the particulate and further in view of the fact that the particulate still exceeds typical Environmental Protective Agency maximum standard allowable particulate counts, it is necessary to take other removal steps.

This additional removal is accomplished at the fan or fans indicated generally at 30. More particularly, massive amounts of water, i.e., in excess of 1.5 gpm per thousand scfm per fan and preferably in excess of 2 gpm per thousand scfm per fan is introduced into the inlet 53 of the fans 30 through the spray nozzle 55.

The basic mechanism of the concept of introducing such massive amounts of water is that agglomeration of the particles is affected by impact between the particles and the wet surfaces of the fan. The first action which occurs is the typical venturi effect of acceleration and dispersion of the water droplets from the nozzle 55 as the water droplets enter the inlet area 53. At this time, some minor particle agglomeration will occur because of direct impingement of the particles with the water droplets.

However, the major effect is obtained within the core of the fan rotor 30. First, the water droplets and some of the aerosol particles will impinge on the surface 52 of the fan backplate. Secondly, the air and the aerosol particles are subject to extremely high acceleration as the particles and the air change direction. More specifically, the air stream direction changes from the axial flow into the rotor to a radial flow outwardly along the fan vanes 51 and to a rotary flow as the radially flowing air is deflected by the fan shroud. There is a substantial difference between the masses of the air, the water and the aerosol particles, thus the water and the particulates lag behind the air in the rotary direction. The statistical probability of impingement between the particulates and the water is a function of the relative speeds of the air, the water and the particulates and the available surface of the water. The fan rotor blades are wetted and provide positive relative motion between these wetted surfaces and the air. Further, the extremely large fan blade surfaces (relative to the particulates size) combines with the relative motion to significantly increase the effective interception and coalescence of the aerosol particles. Also, the particulate is being conveyed is process air which is already at approximately 100% relative humidity so that all of the added water is available for particulate removal.

The coalescence or agglomeration of the aerosol particles creates larger particles which are more readily susceptible to inertia-type separation from the air. The first such inertia-type separation occurs in the zone defined by the inner surface of the fan shroud 50 immediately surrounding the outer periphery of the rotor 30. Here, the air component is moving in a rotary direction, while the entrained particles and the water will tend to move in a radial direction. As a result, the water and the particles are deposited on the inner surface of the fan shroud.

Although unagglomerated aerosol particles follow the air stream in general, they still have sufficient mass to tend to follow the radial direction toward the fully wetted fan housing inner surface. This provides an additional stage of agglomeration and collection.

Thus, it will be seen that the massive amounts of water fed into the fan provides favorable conditions to increase the probability of water-particle interception and coalescence, thereby converting the particles into sizes large enough to be susceptible to simple inertia-type collection. Since it is axiomatic in air cleaning that the effectiveness of an air cleaning device is generally proportional to the amount of energy dissipated during the collection, it is obvious that the forming exhaust fans are extremely high energy dissipating machines and that this high energy dissipation can be utilized as a cleaning mechanism to agglomerate and later separate those particles which heretofore had gone up the stack.

The remaining wetted or agglomerated particles are carried in the fan outlet stream to the penthouse 32 where they are removed by slowing the air stream or by deflection baffles or vanes 33.

The cleaning of particulates from the air by the process of the present invention is effected to a very small extent by the cleanliness or dirtiness of the water, within reasonable limits. Further, the presence or absence of gaseous pollutants in the wash water does not significantly affect the particulate removal efficiency.

This is one of the surprising aspects of the present invention. The utilization of the wash water means that a closed water loop can be used and reused for all phases of the production process, including pollutant removal by the present invention. The elimination of the requirement of fresh water for pollutant removal means that existing recirculatory wash water systems need not be changed to utilize the present invention.

The key to the optimum effectiveness of the pollution control system described above lies in the use of massive volumes of water pumped into the fan 30 through the fan inlet 53 by the nozzle 55. The centrifugal fans of the prior art were normally equipped with a gravity drain at the bottom of the housing for discharging excess water. Since the prior art had never contemplated the use of massive volumes of water injected to the fan for effectively removing most particulate pollutants, such drains were adequate to the need. However, it has been found that the use of massive volumes of water results in the water eventually backing up and at least partially filling the fan housing to reduce the effectiveness of the fan 30 or in the water rising in the conduit 31 toward the penthouse 32. These problems can be totally eliminated if the massive volumes of injected water and at least a portion of the agglomerated composite masses carried in the wash water are positively stripped from the interior of the fan housing 50.

To solve this problem, the bottom and discharge side 61 of the fan housing 50 of FIG. 2 is provided with the plurality of stripping slots 62. Each of these slots 62 extends substantially the entire width 80 of the fan housing 50 (as measured parallel to the axis of the fan support shaft 59) in order to provide maximum water escape capability. At the upper or discharge end of each of the slots 62 is a deflection member or vane 63 which itself extends substantially the entire width 80 of the fan housing 50. Each deflection member or vane 63 extends into the interior of the fan housing 50 and is interposed into the flow path of the wash water as it is forced to travel circumferentially along the interior surface 81 of the outer wall of the fan housing 50. The deflection members 63 operate to intercept the flow of the water along the interior surface 81 of the fan housing 50 so that as the wash water and the agglomerated composite masses contained therein impinge the deflection members 63, the kinetic energy of the wash water itself will positively strip the water and the composite masses contained therein from the interior of the fan housing 50 and divert its flow so as to expel the water through the slots 62. In the preferred embodiment of the present invention, the deflection members 63 may be integrally struck fins or baffles which are formed when the slots 62 are struck.

The deflection members 63 would ideally be formed as fluid-turning vanes (the lower member 63 in FIG. 2), but in the case of large forming fans, a straight substantially planar surface (the middle member 63 in FIG. 2) would be sufficient. In the preferred embodiment the last deflection member 63' on the discharge side 61 of the fan housing 50 would be part of a full 180 fluidturning vane. Furthermore, the last stripping slot 62 associated with the last deflection member 63 would preferably be located on the discharge side 61 on substantially the horizontal centerline of the fan shaft 59 to insure unrestricted water flow through the slots 62.

The stripping slots 62 should be formed to provide sufficient clearance so that the wash water which is stripped from the interior of the fan housing 50 is provided a clear path. A clearance space of from ½ to 3 inches, as illustrated by the distance "d" in FIG. 6 has been found to be sufficient.

The plenum or water shroud 57 includes a base or bottom portion 64 and a vertical upper portions 65. The top 66 of the upper portion 65 forms the remaining portion of the full 180° fluid-turning vane of the last deflection member 63' and directs or diverts the wash water as it flows along the internal surface 81 of the housing 50, the direction of flow of the water being indicated by the arrows of FIG. 2, to change the direction of the water which impinge upon the deflection member 63 to positively expel it through the slot 62 from the interior of the fan housing 50 and into the interior of the water shroud 57. The bottom 64 of the water shroud 57 terminates in a drain pipe 67 which feeds the expelled wash water back to the wash water hopper or reservoir 24 by gravity. The water shroud 57 is designed so as to offer substantially no resistances to the wash water expelled from the slots 62. Furthermore, the shape of the water shroud may be adapted to the clear space available and the maximum utilization of the space under the fan 30 at the lower discharge side quadrant can be made. There should be sufficient clear space inside the water shroud 57 between the fan housing 50 and the outer edges 64,65 of the shroud 57.

In the alternate embodiment illustrated in FIGS. 4 and 5, the upper portion 65 of the water shroud 57 terminates at a point below the last stripping slot 62 on the discharge side 61 of the fan housing 50. The fan 30 is provided with a access door 68 on the discharge side 61 and a full 180° fluidturning vane 69 is rigidly attached to the inside lower end of the access door 68 as by welding or the like. The deflection end 63' of the vane 69 extends into the interior of the fan housing 50 and the discharge or delivery end 70 fits inside and shields with the upper edge of the upper portion 65 of the fixed water shroud 57. This is necessary since many of the centrifugal fans currently in use are provided such access doors which are located at the most desirable location for the full 180° turning vane slot. The leading edge 71 of the last slot 62 on the discharge side 61 of the fan housing 50 may be turned back into the interior of the water shroud 57 for guidance and added strength. Alternately, a bracket means 71, which offers substantially no resistance to the passage of water therethrough can be attached to the sides of the turning vane 69 to house it within the interior of the water shroud 57 and in abutment to the lower edge of the access door 68.

The modified centrifugal fan discussed above greatly increases the effectiveness and efficiency of the present pollution control system by enabling the centrifugal fans to handle the massive volumes of water necessary to meet the stringent EPA requirements.

In operation, a stream of process air containing fine particulate contaminants from a glass wool product-forming process is passed through the centrifugal fan 30 having a venturi inlet 53. Massive volumes of wash water 23 are sprayed into the venturi inlet 53 by nozzle 55 and impinge the backplate 52 and rotor blades 51 to break up the wash water 23 into droplets wetting the fan blades 51 and the interior surfaces of the fan housing 50. The fine particulate contaminants are agglomerated into large composite masses due to particle-water contact during the passage of the process air through the centrifugal fan the wash water and at least a portion of the agglomerated composite masses to flow toward and travel circumferentially along the inside surface 81 of the outside wall of the fan housing 50. As the wash water and the composite masses travel along the inside surface 81 of the housing 50, they impinge upon a deflection member 63 which is interposed into the interior of the fan housing 50. As the wash water and composite masses impinge the deflection member 63, the flow of the water is diverted or redirected through stripping slots 62 and out of the fan housing 50 into the water shroud 57. The wash water and composite masses contained therein are collected in the water shroud 67 and drained away from the fan housing 50 by means of gravity.

The graph of FIG. 7 illustrates a representative plot of the water volume injected into each fan, expressed in terms of the number of gallons per minute per one thousand standard cubic feet per minute of forming air flowing through the fan, versus the percentage reduction of particulate from a control run using approximately 0.2 gpm per thousand scfm of air flow per fan. The points shown as circled dots represent plotted values determined as a result of actual analog tests and the curve represented by the solid line 81 has been drawn to fit the analog test values. The curve 81 shows that the percentage reduction of particulates increases as greater and greater volumes of water are injected into the fans.

Based on typical tests, the percentage reduction in particulate required to maintain typical EPA standards is approximately 54%. This value is represented by the horizontal dashed line 83 on the graph of FIG. 7. Since many variables are involved, it has been found by experimentation, that if the particulates can be reduced to within 10% of the reduction required for total EPA compliance, various other parameters such as the process weight, the temperature, the composition of the catalysts, etc. can be varied until compliance is attained. The horizontal dashed line 85 represents this ten percent threshold or barrier beyond which compliance is possible.

It can be seen that the analog test results show that the critical range is entered at about 1.4 gpm per thousand scfm per fan. Therefore, it seems safe to say that water volumes of 1.5 or more gpm per thousand scfm per fan, which is well within the range as indicated by the triangle 91, should normally enable the operation to be run within the EPA standards. The graph clearly indicates that the utilization of water volumes of 2 or more gpm per thousand scfm per fan will allow the EPA standards to be met with little or no variation of the other parameters.

The circled X's represent the average of the actual values taken from field tests run in Kansas City, Kansas and the dotted line 87 connecting the actual test values indicate that the field test results closely parallel the results of the analog study. Although the field tests did not run greater volumes of injected water due to the physical limitations of the fans at the site being tested, there is every reason to believe that actual test results would continue to parallel the analog results as indicated by the extrapolated projected dotted curve 89. The tests positively indicated that water volumes of 1.5 gpm per thousand scfm per fan brought the reduction to within ten percent of that required by the EPA regulations and subsequent tests have shown that once the critical reduction is attained, the standards can be met by varying other process parameters. Hence, the method and apparatus of the present invention enable compliance with EPA regulations at a minimum cost and without requiring the use of a separate fresh water system.

It will be appreciated that the numerical values hereinbefore set forth are representative only of typical average values which might be encountered in actual plant usage. Generally the method of the present invention is applicable to large volume process air flows in excess of about 50,000 scfm but is not limited thereto. It will, of course, be obvious to those skilled in the art, that various modifications may be made in the method of the present invention and in the apparatus with which it is used without departing from the spirit and scope of the present invention which is limited only by the appended claims.

I claim:

1. A method of removing fine particulate contaminants from a stream of process air comprising the steps of passing the stream of process air through a centrifugal fan having a fan inlet, injecting at least 1.5 gallons per minute of wash water into the inlet for each one thousand standard cubic feet per minute of process air flowing therethrough to break the volume of wash water into droplets and thoroughly wet the fan rotor and the interior of the fan housing, agglomerating the particulates into composite masses of substantially greater size and mass due to particlewater contact during the passage of the process air through the fan, forcing the wash water and at least a portion of the agglomerated composite masses to flow toward and travel along the inside surface of the outside wall of the fan housing, impinging the wash water and composite masses on a deflection member interposed into the path of travel along the inside surface of the outside wall of the fan housing to divert the flow of said wash water and composite masses through a discharge slot and out of the fan housing, and draining the diverted wash water and said at least a portion of the agglomerated composite masses away from the fan housing.

2. In a glass wool product-forming process wherein a stream of process air containing particulate contaminants flows through a centrifugal fan having a rotor and shroud components and a fan inlet interposed between a drop box and a de-entrainment device communicating with an exhaust stack, the improvement comprising the steps of (1) wetting the rotor of said fan with at least 1.5 gallons per minute of water for each one thousand standard cubic feet per minute of process air passing therethrough so that the fan rotor and shroud are coated with a film of water, (2) contacting said contaminants flowing through said fan in said stream of process air with said film of water to agglomerate at least some of said contaminants into composite masses of substantially greater size and mass, (3) utilizing the kinetic energy of the water as it travels along the interior surface of the fan housing to positively strip the film of water and the composite masses contained therein from the fan and (4) inertially separating the remaining composite masses and water from the air stream during the passage of the air stream through the fan and through the de-entrainment device prior to the passage of said air stream up the exhaust stack.

3. In a method of removing particulate contaminants of a size on the order of 100 microns or less from a stream of process air by passing the stream of process air through a centrifugal fan interposed between a drop out box and a de-entrainment device communicating with an exhaust stack, wetting the rotor of said fan with at least 1.5 gallons per minute of water for each one thousand standard cubic feet per minute of process air passing through the fan to break the water into droplets and thoroughly wet the fan rotor and the interior of the fan housing, agglomerating the particulates into composite masses of substantially greater size and mass due to particle-water contact during the passage of the stream of process air through the fan, and separating the agglomerated particles by subsequent inertia separation techniques, the improvement comprising the steps of (1) providing the fan housing with at least one defelctor member and stripping slot extending the full width of the fan, (2) utilizing the kinetic energy of the water wetting the interior of said fan housing as it travels along the interior surface of the fan to impinge said deflector member and strip the water from the interior of the fan and (3) draining the stripped water and the agglomerated particles contained therein away from the fan by gravity.

4. In a glass wool product forming process wherein a stream of process air containing dissolved gaseous resin components and particulate contaminants of a size on the order of 100 microns or less flows through centrifugal fans having rotor and shroud components, said fans being interposed between a drop out box and a de-entrainment penthouse communicating with an exhaust stack, the stack gas flow rate being of excess of 50,000 scfm, the improvement comprising the steps of (1) circulating process water containing some particulate solids and dissolved gaseous resin components in equilibrium therein from a process water collection location through a closed loop including said centrifugal fans, (2) injecting at least 1.5 gallons per minute of the recirculating process water onto the rotor of each of the fans per 1,000 scfm of process air passing therethrough, (3) radially and rotationally wetting the fan rotor and shroud components with a film of said process water, (4) agglomerating at least a portion of the particulate contaminants in said stream of process air by direct contact of said contaminants with the water wetting the fan components, (5) forcing the process water toward and propelling it to travel circumferentially along the interior surface of the outer wall of the fan shrouds, (6) interposing deflection members into the interior of the fan shrouds and into the flow path of the process water, (7) impinging the flowing process water on the deflection members to redirect its flow, (8) exiting the redirected flow of process water and at least a portion of said agglomerated contaminants out of the interior of the fan shrouds, (9) draining the exited wash water away from the fan shroud, (10) separating additional process water and agglomerated particles from the stream of process air as said stream passes through the de-entrainment penthouse, (11)draining said additional separated water and particles from the de-entrainment penthouse, and (12) collecting the drained water at said collection location for re-use as a portion of the circulated process water of step (1).

5. In a centrifugal fan assembly for separating particulate pollutants from a stream of process gas, said fan having a housing, rotary mounted radial fan blades, an inlet to feed said process gas into said fan, a spray means for injecting at least 1.5 gallons per minute of water through said fan inlet for each one thousand standard cubic feet per minute of process gas passing therethrough to break up said water into droplets thoroughly wetting the fan rotor and housing components for agglomerating said particulates into larger masses by particle-water contact for inertia-separation, the improvement comprising stripping means interposed at least partially into the interior of said housing and across substantially the entire width thereof for utilizing the kinetic energy of said water as it travels along the interior surface of said housing to positively expel the water and the agglomerated particulates contained therein from the interior of the fan housing.

6. The improved fan assembly of claim 5 further characterized in that said stripping means includes at least one full 180° fluid-turning vane and at least one discharge slot associated therewith.

7. The improved fan assembly of claim 6 further characterized in that said fan also includes a cylindrical support shaft centrally positioned within said fan housing, said blades being mounted on said shaft and in that said turning vane is located on the discharge side of said housing and is substantially on the horizontal centerline of said support shaft.

8. The improved fan assembly of claim 6 further characterized in that said stripping means includes a fixed external water shroud having an upper portion extending substantially the entire width of said housing, said water shroud offering substantially no resistance to the passage of wash water from said at least one discharge slot, the top of said upper portion being adapted to serve as the discharge end of said 180° fluid-turning vane.

9. The improved fan assembly of claim 5 further characterized in that said stripping means includes a fixed external water shroud having an upper portion extending substantially the entire width of said housing and a plurality of deflection vanes extending substantially the entire width of said housing and interposed at least partially into the interior thereof and wherein said housing includes at least one discharge slot associated with each of said deflection vanes and disposed adjacent thereto, said water shroud offering substantially no resistance to the passage of water from said discharge slot said stripping means further including an access door operably connected to the discharge end of said housing, a full 180° fluid-turning vane rigidly connected to the inside of said access door, the upper portion of said water shroud being adapted to receive the discharge end of said turning vane inside thereof for directing the expelled water into the water shroud, and gravity drain means for draining the wash water from the water shroud.

10. In a system for removing particulate pollutants from a stream of process air from a glass wool product forming process, said system having a drop box for receiving the stream of process air and performing a first separation of larger particulates from the air stream, a centrifugal fan having a fan inlet coupled to the output of said drop box, said fan receiving at least 1.5 gallons per minute of wash water into its inlet for each one thousand standard cubic feet per minute of process air passing therethrough for thoroughly wetting the fan interior and the air stream to agglomerate smaller particles into composite masses of substantially greater size and mass due to particle-water contact during the passage of the air stream through the fan, and a de-entrainment chamber for performing a further inertia separation on the agglomerated particles, the improvement comprising a plurality of deflection members interposed at least partially into the interior of the fan housing for intercepting the wash water and composite masses as they travel along the interior surface of the fan housing and diverting the flow direction thereof, a discharge slot in the wall of said housing for each of said plurality of deflection members for receiving the diverted flow of wash water and composite masses for exiting same from the interior of the fan housing and a water shroud having an input portion coupled across substantially the entire width of said fan housing for collecting the exited wash water and composite masses and gravitationally directing same away from said fan.

11. The system of claim 10 further characterized in that at least one of said deflection members includes a fluid-turning vane.

12. The system of claim 10 further characterized in that at least one of said deflection members has a relatively straight planar surface.

13. The system of claim 10 further characterized in that the last one of said plurality of stripping slots on the discharge side of the fan is located substantially on the horizontal fan shaft centerline.

14. The system of claim 13 further characterized in that said last stripping slot includes a full 180° fluid-turning vane.

15. The system of claim 10 further characterized in that said fan includes an acess door on the discharge side of the fan, the last one of said plurality of stripping slots on the discharge side of the fan has associated therewith a deflection member rigidly connected to the interior of the access door and having its delivery edge adapted to fit inside of a fixed input portion of said water shroud, and said deflection member is a 180° fluid-turning vane.

16. The system of claim 15 further characterized in that said last stripping slot is located substantially on the horizontal fan shaft centerline.

17. The system of claim 16 further characterized in that said water shroud is adapted to offer substantially no resistnce to the passage of said wash water through said stripping slots and said water shroud includes a drain pipe to convey said wash water to a wash water hopper by gravity.

* * * * *